US010544833B2

(12) United States Patent
Abrahamson

(10) Patent No.: US 10,544,833 B2
(45) Date of Patent: Jan. 28, 2020

(54) ROLLER BEARING ASSEMBLY WITH RETAINER RING

(71) Applicant: KOYO BEARINGS USA LLC, Westlake, OH (US)

(72) Inventor: Scott Abrahamson, Piedmont, SC (US)

(73) Assignee: Koyo Bearings North America LLC, Greenville, SC (US)

(*) Notice: Subject to any disclaimer, the term of this patent is extended or adjusted under 35 U.S.C. 154(b) by 0 days.

(21) Appl. No.: 15/500,231

(22) PCT Filed: Jul. 30, 2014

(86) PCT No.: PCT/US2014/048878
§ 371 (c)(1),
(2) Date: Jan. 30, 2017

(87) PCT Pub. No.: WO2016/018302
PCT Pub. Date: Feb. 4, 2016

(65) Prior Publication Data
US 2018/0209481 A1 Jul. 26, 2018

(51) Int. Cl.
F16C 33/52 (2006.01)
F16C 19/26 (2006.01)
(Continued)

(52) U.S. Cl.
CPC .............. F16C 33/52 (2013.01); F16C 19/26 (2013.01); F16C 33/588 (2013.01); F16C 33/64 (2013.01);
(Continued)

(58) Field of Classification Search
CPC .......... F16C 17/26; F16C 33/51; F16C 33/52; F16C 33/54; F16C 33/542; F16C 33/588; F16C 33/64; F16C 43/065; F16C 2223/10
See application file for complete search history.

(56) References Cited

U.S. PATENT DOCUMENTS 452,751 A 5/1891 Eveland
1,015,273 A * 1/1912 Cartwright .............. F16C 33/52
384/589

(Continued)

FOREIGN PATENT DOCUMENTS

AT 102708 * 3/1926
DE 550454 * 5/1932
(Continued)

OTHER PUBLICATIONS

International Search Report and Written Opinion for PCT/US2014/048878 dated Apr. 2, 2015.
(Continued)

Primary Examiner — James Pilkington
(74) Attorney, Agent, or Firm — Nelson Mullins Riley & Scarborough LLP

(57) ABSTRACT

A roller bearing assembly (100) including an outer cup (110) having a first end, a second end, a body (116) extending therebetween defining an outer raceway (118), a first flange (112) disposed on the first end of the body and a second flange (114) disposed on the second end of the body, a plurality of rollers (130), each roller including a first projection (134) extending along its longitudinal center axis, and a first retainer ring (140a) having a base side wall, an inner side wall and an outer side wall, the inner side wall and the outer side wall extending outwardly from the base wall, wherein the base wall of the first retainer ring is disposed adjacent an inner surface of the first flange and the first projection of each roller is rotatably disposed between the inner side wall and the outer side wall of the first retainer ring.

8 Claims, 5 Drawing Sheets

(51) Int. Cl.
F16C 43/06 (2006.01)
F16C 33/58 (2006.01)
F16C 33/64 (2006.01)

(52) U.S. Cl.
CPC ........ F16C 43/065 (2013.01); *F16C 2223/10* (2013.01)

(56) References Cited

U.S. PATENT DOCUMENTS

| | | |
|---|---|---|
| 1,171,102 A | 2/1916 | Demarchi |
| 2,038,475 A | 9/1934 | Brown |
| 2,065,475 A | 12/1936 | Robinson |
| 2,166,673 A | 7/1939 | Barr |
| 2,198,376 A | 4/1940 | Cederberg |
| 2,567,242 A | 9/1951 | Smith |
| 2,606,798 A | 8/1952 | Hickling |
| 2,676,074 A | 4/1954 | Nusbaum |
| 2,794,693 A | 6/1957 | Burkhalter et al. |
| 2,818,313 A | 12/1957 | Gales |
| 2,969,266 A | 1/1961 | Schaeffler |
| 3,206,829 A | 9/1965 | Schaeffler et al. |
| 3,348,889 A | 10/1967 | Schaeffler et al. |
| 3,404,926 A | 10/1968 | Horne |
| 3,409,337 A | 11/1968 | Foote, Jr. |
| 3,423,140 A | 1/1969 | Cowles |
| 3,447,848 A | 6/1969 | Pitner |
| 3,462,205 A | 8/1969 | Darr et al. |
| 3,510,182 A | 5/1970 | Cowles |
| 3,510,927 A | 5/1970 | Leak |
| 3,549,221 A | 12/1970 | Leak |
| 3,999,817 A * | 12/1976 | Bhateja ............... F16C 19/30 384/623 |
| 4,565,458 A | 1/1986 | Achee et al. |
| 5,848,846 A | 12/1998 | Sugiyama et al. |
| 6,742,935 B2 | 6/2004 | Saji |
| 8,337,092 B2 | 12/2012 | Kazama et al. |
| 2008/0166081 A1 | 7/2008 | Crittenden et al. |
| 2009/0245706 A1 | 10/2009 | Morishita et al. |

FOREIGN PATENT DOCUMENTS

| | | |
|---|---|---|
| DE | 19732478 A1 | 1/1998 |
| DE | 102010026804 A1 | 1/2012 |
| FR | 1135019 A | 4/1957 |
| GB | 493886 A | 10/1938 |
| JP | U11989100926 | 7/1986 |
| JP | UM 6-048184 | 12/1994 |
| JP | H10237620 | 9/1998 |
| JP | 2004108479 | 4/2004 |

OTHER PUBLICATIONS

Notice of Preliminary Rejection dated Mar. 3, 2018 for corresponding Korean Patent Application No. 10-2017-7002102.
Office Action dated Jan. 29, 2018 for corresponding Japanese Patent Application No. 2017-505080.
Office Action dated Mar. 27, 2018 for corresponding Chinese Patent Application No. 201480080915.6.
Examination Report dated Aug. 27, 2018 for corresponding European Patent Application No. 14752699.0.
Second Office Action dated Feb. 19, 2019 for corresponding Chinese Patent Application No. 201480080915.6., 17 pages.

* cited by examiner

ROLLER BEARING ASSEMBLY WITH RETAINER RING

FIELD OF THE INVENTION

The present invention relates generally to roller bearings. More particularly, the present invention relates to a roller retainer ring for use in connection with a full complement radial roller bearing.

BACKGROUND OF THE INVENTION

Full complement roller bearings 10, such as the one shown in FIG. 1, are typically made by first draw forming an annular metal sleeve from strip stock to create an outer cup 12. Typically, both ends of the sleeve are formed to provide an integral roller retaining feature that prevents both axial and radial displacement of the corresponding plurality of rollers 18. First, an integral, radially inwardly extending flange 14 with an axially extending lip 16 is formed at a first end of the annular sleeve, commonly referred to as the "bottom" of the outer cup. Next, rollers 18 which have axial projections 22, commonly called trunnions, at each end are placed in the annular sleeve. The trunnions of the rollers can range in shape from complex (as shown in FIG. 1) to simple conical. The first end of each trunnion roller 18 is disposed between an outer raceway formed by the sleeve and the corresponding axially extending lip 16 so that the first end of each trunnion roller 18 is held in place radially in the cupped end.

Lastly, an integral, radially inwardly extending curled flange 15 is formed at the opposite end of the annular sleeve so that axial projections 22 on the second end of trunnion rollers 18 are disposed between the outer raceway and a corresponding axially extending lip 17 on the inner perimeter of flange 15. As such, both ends of each trunnion roller 18 are radially and axially retained.

Flanges 14 and 15 and their corresponding lips 16 and 17, respectively, of the outer cup form axial thrust faces for the ends of the plurality of trunnion rollers 18. With a full complement of rollers, the surfaces where the ends of the trunnion rollers contact the flanges must be hardened to protect them from wear. Typically, the annular sleeve from which outer cup 12 is produced is made of low carbon steel and must be heat treated to harden it and, thereby, provide the outer raceway. However, once the annular sleeve is carburized through heating, flange 15 cannot be easily curled without cracking.

One approach for making the formed lips 16 and 17 at the ends of the corresponding flanges 14 and 15, respectively, requires assembling the components of the roller bearing into outer cup 12 prior to it being heat treated. With the components fully assembled, second flange 15 and lip 17 can be formed prior to hardening outer cup 12, thereby preventing cracking. Thereafter, the entire roller bearing 10 is heat treated. This process dictates that the materials used for rollers 18 must be amenable to heat treatment. Where differing materials are used for outer cup 12 and rollers 18, it is common to subject rollers 18 to a heat treatment prior to the heat treatment of the assembled bearing, adding to cost. As well, the presence of rollers 18 in outer cup 12 during heat treatment can block portions of the cup, which are in contact with the rollers, resulting in "soft" spots and reduced cup life. As well, the presence of rollers in outer cup 12 during heat treatment can lead to increased carbon deposits, requiring cleaning of the bearing.

Alternately, it is known to form flanges 14 and 15, with lips 16 and 17, prior to insertion of rollers 18. Outer cup 12 is then heat treated, followed by the insertion of rollers 18. Assembly of rollers 18 into the heat treated outer cup 12 is a complicated and somewhat costly process. In yet another process, it is known to use a copper mask to prevent hardening of the portion of outer cup 12 that is to be top flange 15. After heat transferring outer cup 12, the copper mask is removed with a chemical solution so that top flange 15 can be formed. This process is costly and can have adverse and environmental impact.

One solution, as shown in FIG. 2, has been to produce a roller bearing assembly 30 including a cage 36 which defines a roller pocket 38 for each roller 40. The cage eliminates the need to provide an axially extending lip on the inner perimeter of the flanges 34 of the bearing's outer cup 32. However, as cage 36 includes axially extending members 38 disposed between adjacent rollers 40, the number of rollers as compared to the full complement bearing assembly 10 must be reduced, meaning the loading that bearing assembly 30 can withstand is less than that of bearing assembly 10.

The present invention recognizes and addresses considerations of prior art constructions and methods.

SUMMARY OF THE INVENTION

One embodiment of the present disclosure provides a roller bearing assembly including an outer cup having a first end, a second end, a body extending therebetween defining an outer raceway, a first flange depending radially inwardly from the first end of the body and a second flange extending radially inwardly from the second end of the body, a plurality of rollers, each roller including a first projection extending outwardly from a first end thereof along a longitudinal center axis of the roller, and a first retainer ring having a base wall, an inner side wall and an outer side wall, the inner side wall extending outwardly from an inner perimeter of the base wall and the outer side wall extending outwardly from an outer perimeter of the base wall. The base wall of the first retainer ring is disposed adjacent an inner surface of the first flange and the first projection of each roller is rotatably disposed between the inner side wall and the outer side wall of the first retainer.

Another embodiment of the present disclosure provides an outer cup having a first end, a second end, a body extending therebetween defining an outer raceway, a first flange depending radially inwardly from the first end of the body and a second flange extending radially inwardly from the second end of the body, a plurality of rollers, each roller including a first end with a first end surface, a second end with a second end surface and a body extending therebetween, a first retainer ring having a base wall, the base wall including an outer surface and an inner surface that is configured to rotatably receive a first portion of the first end surface of each roller, wherein the outer surface of the base wall of the first retainer ring is disposed adjacent an inner surface of the first flange and the inner surface of the base wall of the first retainer ring is a concave surface.

Yet another embodiment of the present disclosure provides a roller bearing assembly including an outer cup having a first end, a second end, a body extending therebetween defining an outer raceway, a first flange depending radially inwardly from the first end of the body and a second flange extending radially inwardly from the second end of the body, a plurality of rollers, each roller including a first projection extending outwardly from a first end thereof along a longitudinal center axis of the roller, and a first retainer ring having a base wall and an inner side wall, the inner side wall extending axially from an inner perimeter of the base wall, wherein the base wall of the first retainer ring is disposed adjacent an inner surface of the first flange and the first projection of each roller is rotatably disposed between the inner side wall of the first retainer ring and the outer raceway of the outer cup.

Another embodiment of the present disclosure provides a method of producing a roller bearing assembly including providing an outer cup having a first end, a second end, a body extending therebetween defining an outer raceway, and a first flange depending radially inwardly from the first end of the body, performing a heat treatment on the outer cup, performing a tempering process on a portion of the second end of the outer cup, providing a first retainer ring having a base wall and an inner side wall, the inner side wall extending axially from an inner perimeter of the base wall, positioning the first retainer ring inside the outer cup adjacent the first flange, providing a plurality of rollers, each roller including a first projection extending outwardly from a first end thereof along a longitudinal center axis of the roller, positioning the plurality of rollers inside the outer cup so that the first projection of each roller is disposed between the outer raceway of the outer cup and the inner side wall of the outer cup, and bending the tempered portion of the second end of the outer cup inwardly, thereby forming a second flange on the second end of the outer cup.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
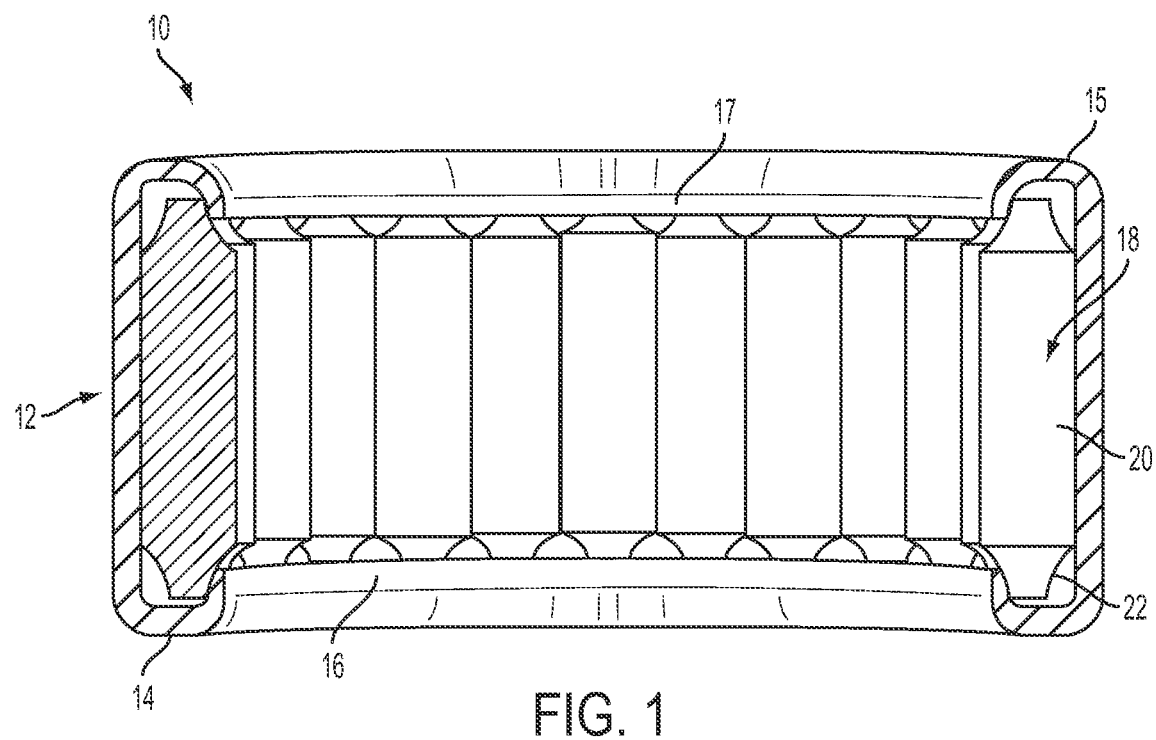
FIG. 1 is a cross-sectional view of a prior art full complement roller bearing.
Figure 2:
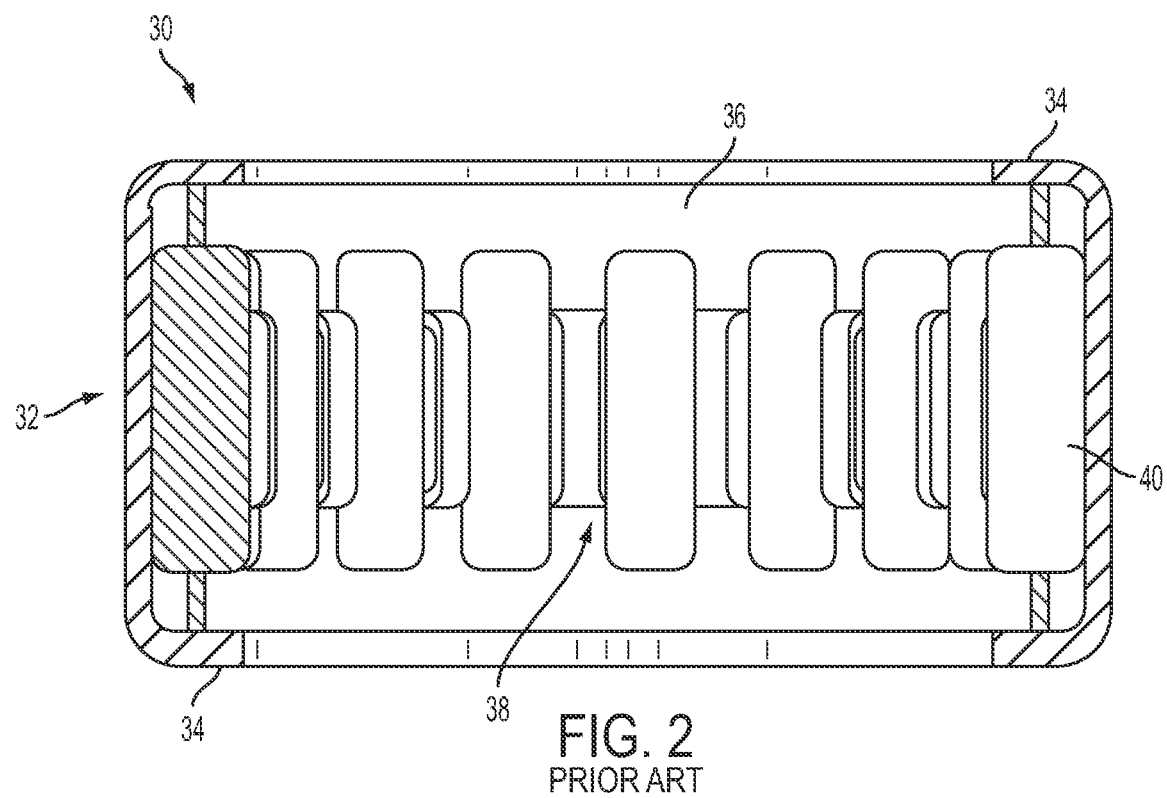
FIG. 2 is a cross-sectional view of an alternate embodiment of a prior art roller bearing including a cage.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 3:
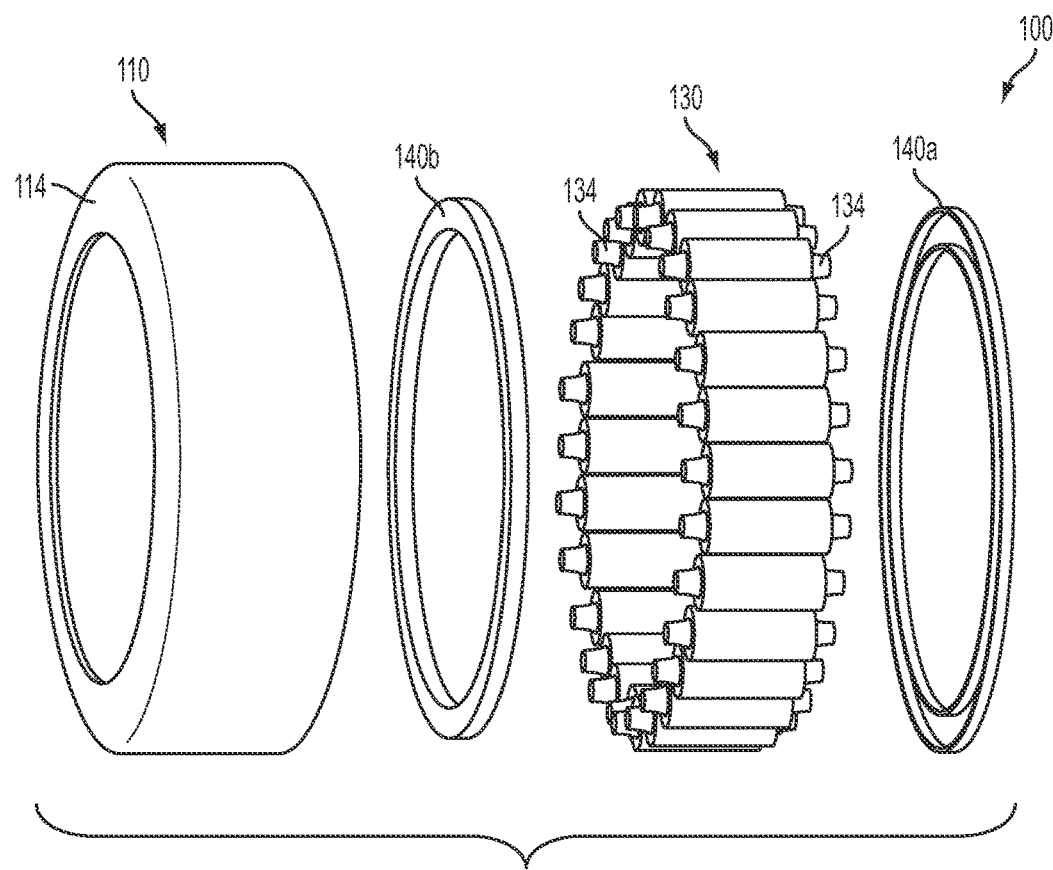
FIG. 3 is an exploded perspective view of a roller bearing assembly including a roller retainer ring in accordance with the present disclosure.
Figure 4:
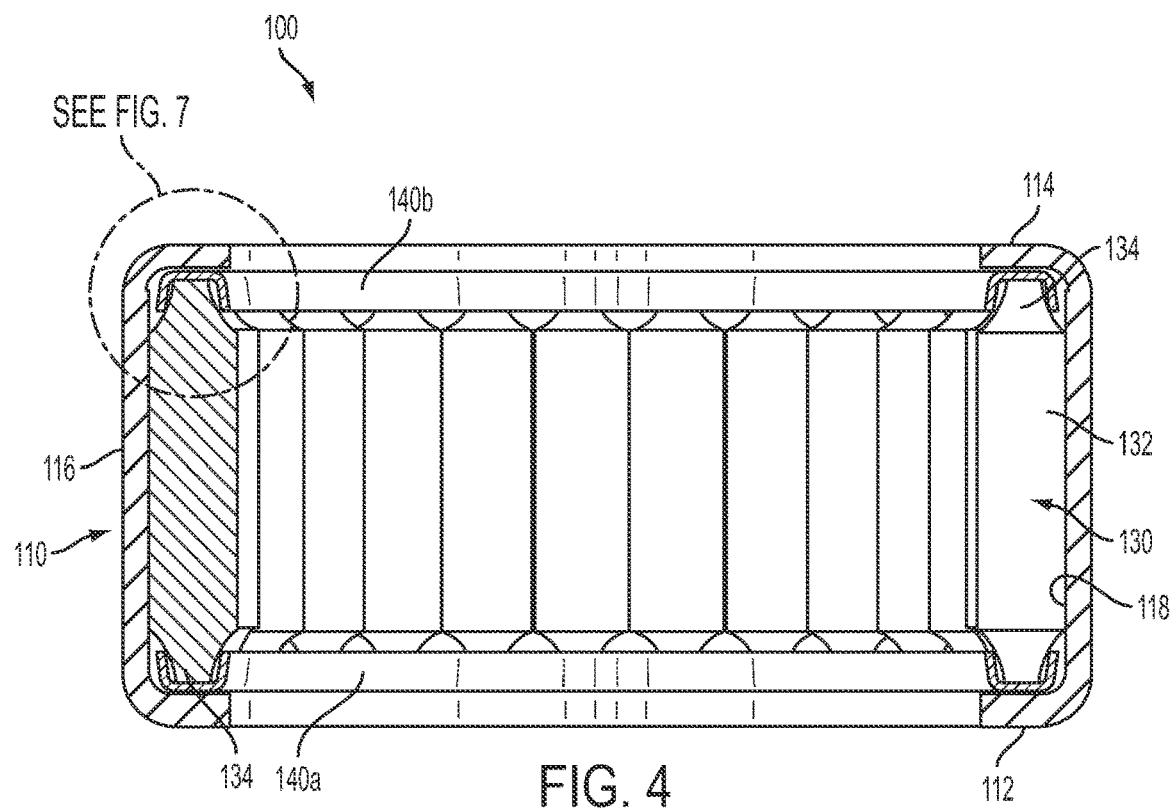
FIG. 4 is a cross-sectional view of the roller bearing assembly shown in FIG. 3.

Referring now to the figures, as shown in FIGS. 3 and 4, an embodiment of a roller bearing assembly 100 in accordance with the present disclosure includes an outer cup 110, a plurality of trunnion rollers 130 rotatably received therein, and a pair of retainer rings 140a, 140b disposed at opposing ends of rollers 130 that are configured to retain rollers 130 in outer cup 110. As shown, outer cup 110 includes a first radially inwardly extending flange 112 disposed on its first end, a second radially inwardly extending flange 114 disposed on its second end, and a body 116 extending therebetween, the inner surface of which defines an outer raceway 118 of the bearing assembly.

Preferably, outer cup 110 is a drawn cup formed from an annular metal sleeve of low carbon steel. Prior to assembling the components of bearing assembly 100 into outer cup 110, first end flange 112 is formed at one end of outer cup 110. After the formation of first end flange 112, outer cup 110 is heat treated to obtain the desired properties for outer raceway 118. Second end flange 114 is formed only after the remaining components of the bearing assembly, i.e. rollers 130, retainer rings 140, bearing seals 160 (FIG. 10), etc., are assembled in outer cup 110, as discussed in greater detail below. However, in preparation for the later formation of second end flange 114, a portion of outer cup 110 opposite first end flange 112 is subjected to a temper process. The temper process anneals that portion of outer cup that is to be bent inwardly, thereby forming second end flange 114, subsequent to the assembly of the remaining bearing components, as discussed in greater detail below.

Figure 5:
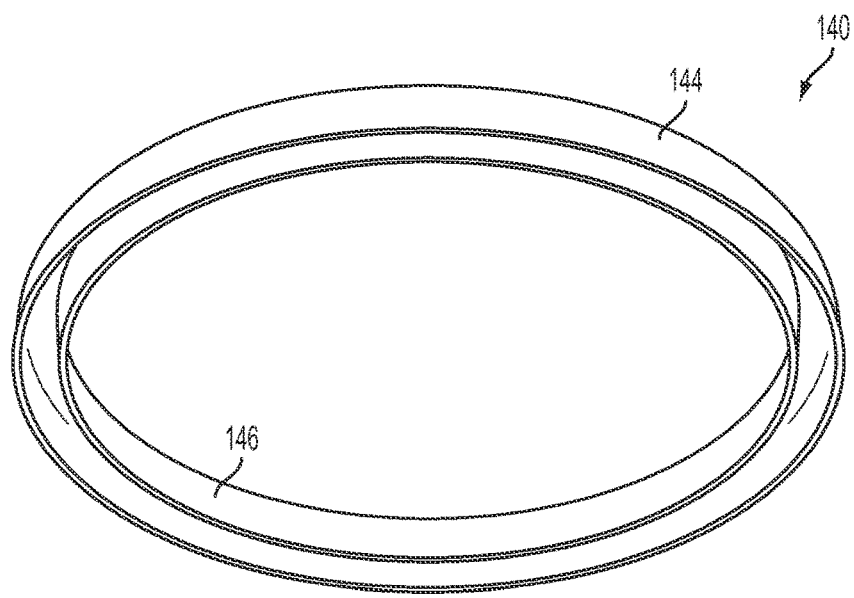
FIG. 5 is a bottom perspective view of the roller retainer ring of the roller bearing assembly shown in FIG. 3.
Figure 6:
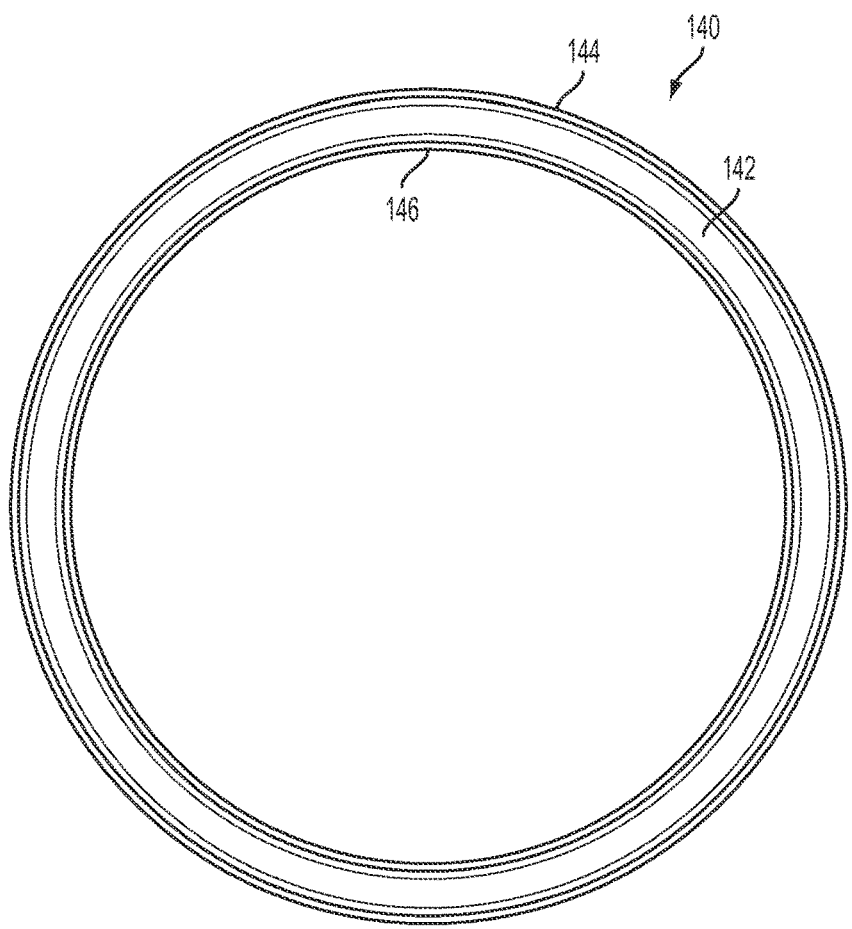
FIG. 6 is a bottom view of the roller retainer ring of the roller bearing assembly shown in FIG. 3.
Figure 7:
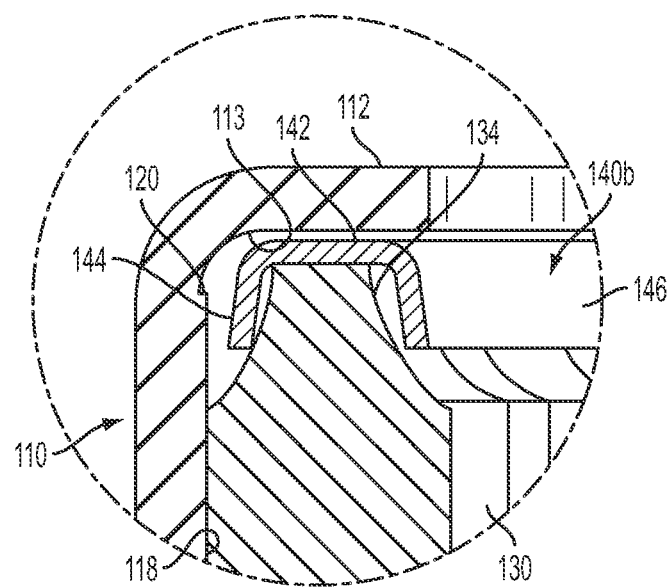
FIG. 7 is a partial cross-sectional view of the roller bearing assembly as shown in FIG. 4, enlarged to show detail of the roller retainer ring.

Referring additionally to FIGS. 5 and 6, each retainer ring 140a, 140b includes a base wall 142, an outer side wall 144 extending from an outer perimeter of base wall 142, and an inner side wall 146 extending from an inner perimeter of base wall 142, so that retainer rings 140a, 140b are of a substantially U-shaped cross section. To further assemble bearing assembly, a first retainer ring 140a is positioned in outer cup 110 such that an outer surface of base wall 142 is adjacent an inner surface of first end flange 112. Preferably, the outer diameter of retainer rings 140a, 140b is slightly less than the inner diameter of outer cup 110 so that retainer rings 140a, 140b are rotatable with respect to the cup. This facilitates assembly as retainer rings 140a, 140b may be "dropped into" outer cup 110, rather than pressed in. Next, an axially extending projection 134 disposed at a first end of each roller 130 is rotatably received between outer and inner side walls 144 and 146 of first retainer ring 140a. After positioning an axial projection 134 of each roller 130 within first retainer ring 140a, second retainer ring 140b is positioned so that the second axially extending projection 134 of each roller 130 is received between its outer and inner side walls 144 and 146. So positioned, the outer surface of each roller's cylindrical body 132 is in rolling contact with outer raceway 118 of outer cup 110.

Interaction of each roller's axially extending projections 134 with the side walls 144 and 146 of first and second retainer rings 140a and 140b prevent radially inward motion of each roller 130. Once second retainer ring 140b is in position, second end flange 114 is bent radially inwardly, thereby axially retaining rollers 130 within outer cup 110. Second flange 114 is preferably formed by one of spin curling, punch curling, orbit forming and radial forming. As previously noted, the portion of outer cup 110 that is to become second end flange 14 is subjected to a temper process prior to assembly of the bearing components to facilitate forming of the metal. Preferably, second end flange 114 is thinner than first end flange 112 to facilitate forming second end flange 114 after the components are assembled. As such, a radially extending ledge 120 extends outwardly from outer raceway 118 to the base of second end flange 114. Because retainer rings 140a, 140b are dropped into outer cup 110 rather than being pressed in, retainer rings 140a, 140b may be identical to each other as opposed to different sizes based on the different inner diameter of second end flange 114 at ledge 120. Additionally, first and second retainer rings 140a and 140b are preferably formed from a heat treatable material, such as carbon steel, so that retainer rings provide a hard surface for the axially extending projections of each trunnion roller 130 to ride against. However, first and second retainer rings 140a, 140b may also form from plastics or reinforced polymers in various applications.

Figure 8:
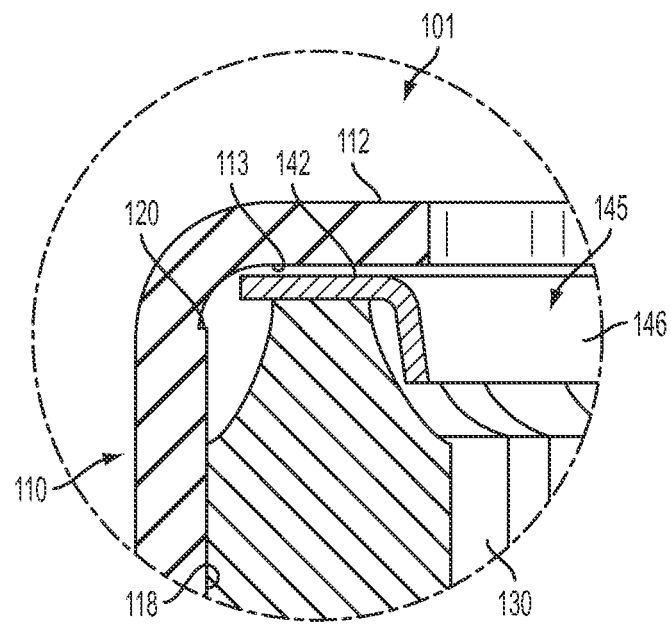
FIG. 8 is a partial cross-sectional view of an alternate embodiment of a roller retainer ring in accordance with the present disclosure.

Referring now to FIG. 8, an alternate embodiment of a roller bearing assembly 101 in accordance with the present disclosure is shown. Bearing assembly 101 differs primarily from the previously discussed embodiment in that retainer rings 145 do not include outer side walls. Rather, each retainer ring 145 includes a base wall 142 and an inner side wall 146 extending from an inner perimeter of base wall 142, so that retainer rings 145 are of a substantially L-shaped cross-section. To assemble the bearing assembly, a first retainer ring 145 is positioned in outer cup 110 such that an outer surface of base wall 142 is adjacent an inner surface of first end flange 112. As with the first embodiment, the outer diameter of retainer ring 144 is slightly less than the inner diameter of outer cup 110 so that retainer rings 145 are rotatable with respect to outer cup 110. Next, an axially extending projection 134 disposed at a first end of each roller 130 is rotatably received radially outwardly of inner side wall 146 of the first retainer ring 145. Next, a second retainer ring 145 is positioned so that the second axially extending projection 134 of each roller 130 is received radially outwardly of its inner side wall 146. So positioned, the outer surface of each roller's cylindrical body 132 is in rolling contact with outer raceway 118 of outer cup 110. As well, interaction of each roller's axially extending projections 134 with inner side walls 146 of the first and second retainer rings 145 prevent radially inward motion of each roller 130. Once the second retainer ring 145 is in position, second end flange 114 is bent radially inwardly, as discussed above.

Figure 9:
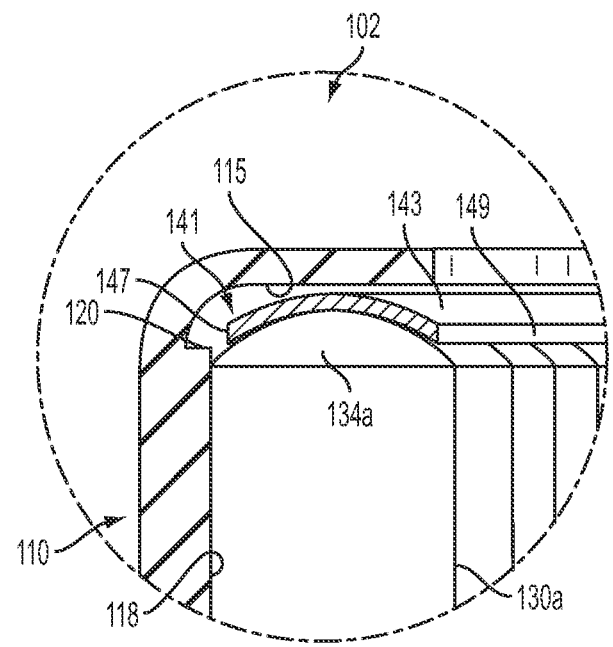
FIG. 9 is a partial cross-sectional view of an alternate embodiment of a roller retainer ring in accordance with the present disclosure.

Referring now to FIG. 9, an alternate embodiment of a roller bearing assembly 102 in accordance with the present disclosure is shown. Bearing assembly 102 differs primarily from the previously discussed embodiment in that retainer rings 141 do not include inner and outer side walls. Rather, each retainer ring 141 includes a base wall 143 having an inner surface and outer surface, wherein the cross-sections of the inner and outer surfaces form continuous curves that extend from an outer perimeter 147 to an inner perimeter 149 of the retainer ring. As shown, the outer surface of base wall 143 is a convex surface, and the inner surface of base wall 143 is a correspondingly-shaped concave surface. Accordingly, each roller 130a of bearing assembly 102 includes an axially extending projection 130a on each end of the roller, wherein the cross section of each axial projection 134a is convex. Preferably, the radius of curvature of each axial projection's cross section is substantially the same as the radius of curvature of the inner surface of the corresponding retainer ring 141. Note, in yet another embodiment, first and second retainer rings 140a and 140b could similarly include a base wall with a convex outer surface and a concave inner surface, and correspondingly-shaped axially extending projections on the rollers.

Figure 10:
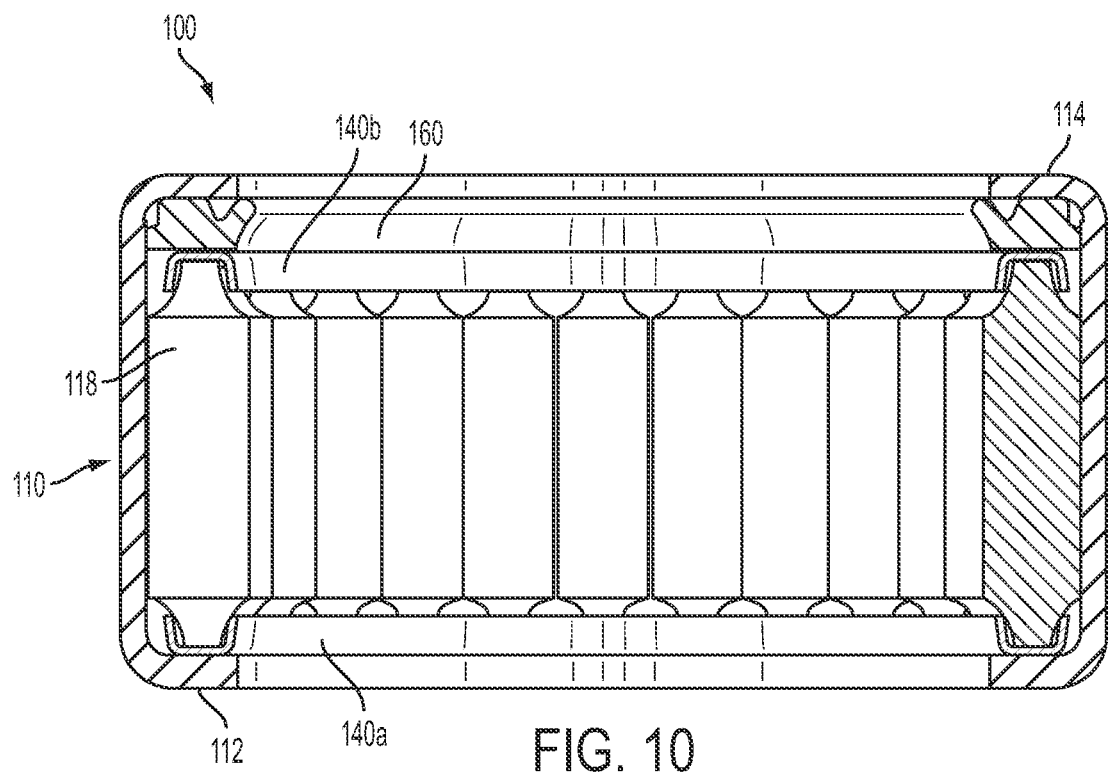
FIG. 10 is a cross-sectional view of a roller bearing assembly in accordance with the present disclosure that includes a seal at one end.

Referring now to FIG. 10, an embodiment of bearing assembly 100 is shown in which a bearing seal 160 is disposed on one end of the bearing. In contrast to prior art full complement bearing assemblies 10 which typically include axially extending lips 16 and 17 on the corresponding end flanges 14 and 15, as shown in FIG. 1, the use of retainer rings 140a and 140b negate the need for the prior art lips and, therefore, facilitate use of bearing seals at either, or both, ends of the bearing.

While one or more preferred embodiments of the invention are described above, it should be appreciated by those skilled in the art that various modifications and variations can be made in the present invention without departing from the scope and spirit thereof. For example, the cross-sectional shapes of the retainer ring may be of any shape found to be suitable for the intended purpose. It is intended that the present invention cover such modifications and variations as come within the scope and spirit of the appended claims and their equivalents.

What is claimed is:

1. A roller bearing assembly, comprising:
an outer cup having a first end, a second end, a body extending therebetween defining an outer raceway, a first flange depending radially inwardly from the first end of the body and a second flange extending radially inwardly from the second end of the body;
a plurality of rollers, each roller including a first projection extending outwardly from a first end thereof along a longitudinal center axis of the roller; and
a first retainer ring having a base wall with an inner surface and an outer surface, an inner side wall with an inner surface and an outer surface, and an outer side wall with an inner surface and an outer surface, the inner side wall extending outwardly from an inner perimeter of the base wall and the outer side wall extending outwardly from an outer perimeter of the base wall so that the first retainer ring defines an annular groove having a U-shaped cross-section,
wherein the outer surface of the base wall of the first retainer ring is disposed adjacent an inner surface of the first flange and the first projection of each roller is rotatably disposed adjacent the base wall between the inner side wall and the outer side wall of the first retainer ring so that each roller is independently rotatable about the inner side wall.

2. The roller bearing assembly of claim 1, wherein the first retainer ring is rotatable with respect to the outer cup.

3. The roller bearing assembly of claim 1, wherein the base wall of the first retainer ring is substantially planar.

4. The roller bearing assembly of claim 1, wherein the inner side wall and the outer side wall of the first retainer ring are substantially concentric.

5. The roller bearing assembly of claim 1, wherein the base wall of the first retainer ring has a convex outer surface and a concave inner surface.

6. The roller bearing assembly of claim 1, further comprising a first radially extending ledge extending outwardly from the outer raceway to a proximal end of the first flange.

7. The roller bearing assembly of claim 1, further comprising:
   a second projection extending outwardly from a second end of each roller along the longitudinal center axis of each roller; and
   a second retainer ring having a base wall with an inner surface and an outer surface, an inner side wall with an inner surface and an outer surface, and an outer side wall with an inner surface and an outer surface, the inner side wall extending outwardly from an inner perimeter of the base wall and the outer side wall extending outwardly from an outer perimeter of the base wall so that the second retainer ring defines an annular groove having a U-shaped cross-section,
   wherein the outer surface of the base wall of the second retainer ring is disposed adjacent an inner surface of the second flange and the second projection of each roller is rotatably disposed adjacent the base wall between the inner side wall and the outer side wall of the second retainer ring so that each roller is independently rotatable about the inner side wall of the second retainer ring.

8. The roller bearing assembly of claim 1, wherein a distal edge of the inner side wall and a distal edge of the outer side wall are separated by a first radial distance, and the inner perimeter and the outer perimeter of the base wall are separated by a second radial distance, the first radial distance being greater than the second radial distance.

* * * * *